Patented Sept. 18, 1923.

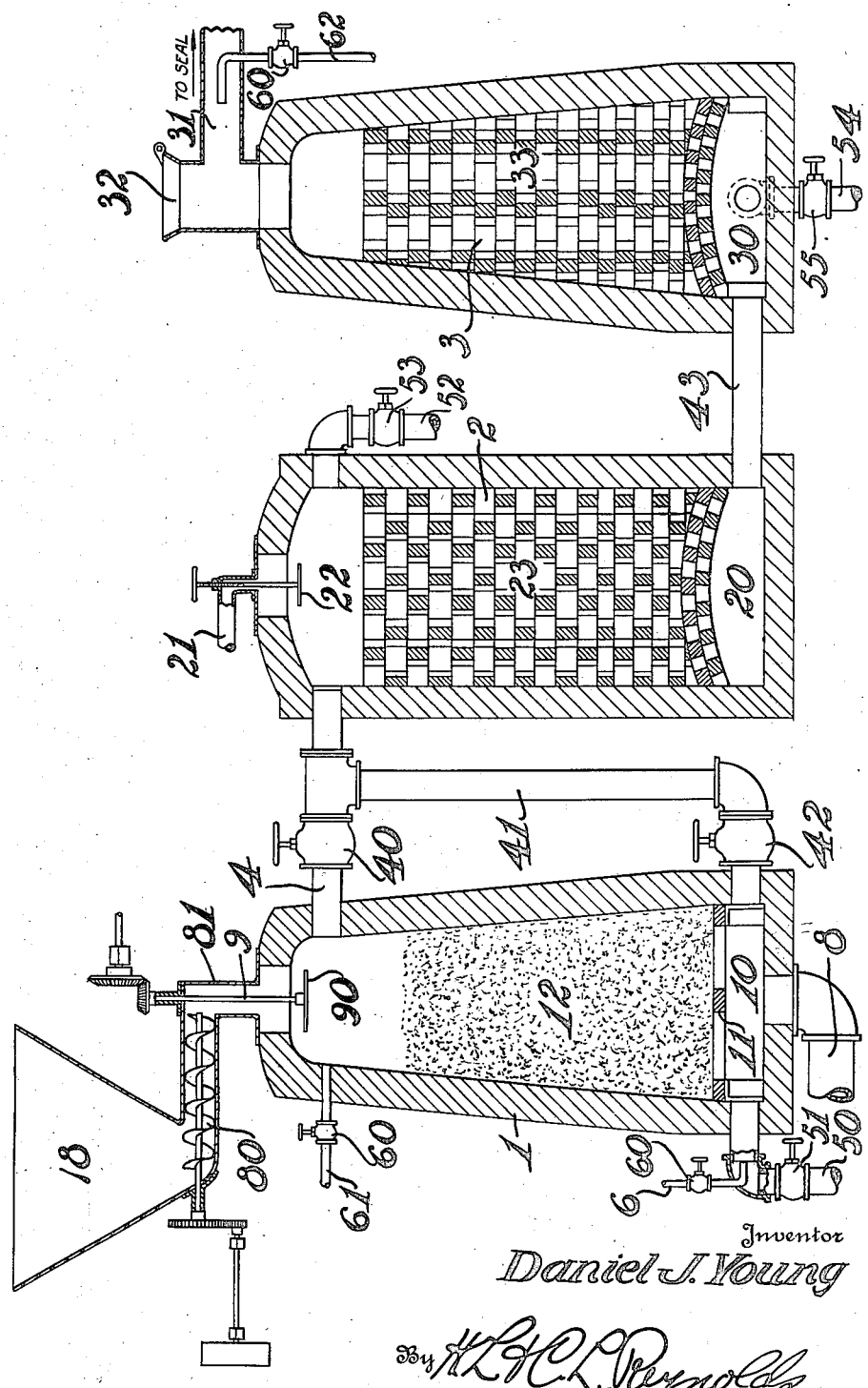

1,468,190

UNITED STATES PATENT OFFICE.

DANIEL J. YOUNG, OF TACOMA, WASHINGTON, ASSIGNOR TO YOUNG-WHITWELL GAS PROCESS COMPANY, OF TACOMA, WASHINGTON, A CORPORATION OF WASHINGTON.

PROCESS FOR MAKING ILLUMINATING GAS.

Application filed June 14, 1921. Serial No. 477,365.

*To all whom it may concern:*

Be it known that I, DANIEL J. YOUNG, a citizen of the United States of America, and a resident of the city of Tacoma, in the county of Pierce and State of Washington, have invented certain new and useful Improvements in Processes for Making Illuminating Gas, of which the following is a specification.

My invention relates to a process for the manufacture of illuminating gas. This process is based upon the usual water gas process and its object is to make more feasible and practical the use of raw coal or other carbonaceous matter, such as lignite, now unsuited for use in that process, as the fuel for charging the generator and also to efficiently utilize the excess heat which is generated when such material is employed as the source of the fuel in the generator when operating in accordance with the customary method of operating a water gas plant.

It is one object of my invention to make it possible to easily add to the usual water gas apparatus, such parts as may be necessary to enable the same to be operated in accordance with my invention and therefore to enable these plants to be operated at a higher efficiency and with greater flexibility than is possible with the present method of operation.

Another object is to economically utilize the excess heat which is generated in such plants when coal instead of coke is used as the charging fuel for the generator.

A further object of my invention is to prevent objectionable clogging of the heat transferring parts of the apparatus, such as the carburetor and the super-heater, with deposited carbon and also to periodically convert such carbon as may be deposited in such parts of the apparatus into water gas, thus eliminating the objectionable result of clogging the apparatus and at the same time converting the carbon which is deposited therein into gas.

Other objects of my invention will be disclosed by the description which is to be given thereof, and the features which I believe to be new and upon which I desire to secure Letters Patent will be particularly set forth in the claims.

The accompanying drawing is a central vertical section showing a standard type of construction for water gas plants, to which has been added the features which are novel to my present invention.

This plant as illustrated consists of a generator 1, a carburetor 2, and a superheater 3, these being of any standard or satisfactory type of construction. These are provided with the usual connections for the transfer of gas and air from one to the other. This comprises a pipe 4 connecting the upper parts of the generator and carburetor and containing therein a valve 40. A pipe 41 is also provided, connecting the pipe 4 with the lower chamber 10 of the generator beneath the grate 11. This also is provided with a valve 42. A pipe as 43 is provided connecting the chambers 20 and 30 contained at the bottom of the carburetor and superheater, respectively, with each other.

The upper part of the superheater is provided with the usual gas off-take connection, as 31, and also with a stack valve, as 32, which is opened for the discharge of the gases formed during the blasting run. The above features are substantially standard in construction for a water gas plant. The carburetor is also provided with means for introducing oil or other suitable enriching hydrocarbons at its upper end, this being represented by a pipe, as 21, and a distributer as 22, which is placed just within the chamber of the carburetor. This is, or may be, also of standard construction.

A steam pipe 6 is provided for supplying steam to the bottom of the generator and a like pipe 61 for supplying steam above the fuel bed of the generator. Valves 60 control each of these steam pipes. A similar steam supply pipe 62 is placed at the discharge end of the superheater 3. Steam pipe 61 is used in making down runs, as is common in water gas generators. At such times the gas passes to the carburetor through pipe 41. A gas off-take pipe 8 connects with the bottom of the generator, this being one of the features of my invention.

Air is supplied beneath the fuel bed of the generator for use in blasting, through pipe 50 and is controlled by valve 51. Supplemental air supply pipe 52 connects with the upper part of carburetor and is controlled by valve 53. A supplemental air pipe 54 connects with the bottom of the superheater and is controlled by valve 55.

In operating in accordance with the usual practice of a water gas plant, air would be introduced for a period beneath the grate 11 and would pass up through the fuel bed 12 during the blasting process. Supplemental air is also introduced when desired through pipes 52 to the carburetor and pipes 54 to the superheater, as may be necessary for proper combustion. This supplemental air is controlled by valves 53 and 55. This blast gas would be passed over through the pipe 4 to the carburetor, through the checker work 23 therein, taken through the pipe 43 to the superheater 3 and up through the checker work 33 therein and out through the stack valve 32.

In the gas making run the air supply from pipes 50, 52, and 54, would be discontinued and steam introduced through the pipe 6 or pipe 61 according as the run was up or down. During this run oil would be introduced through the pipe 21 and the operation would be exactly in conformity with the usual gas making run of a water gas plant.

In carrying out my process the blasting run is carried to a point where the checker work in both the carburetor and the superheater is raised to a somewhat higher temperature than would be required by the operation of the usual water gas process.

Instead of following this blasting operation by the usual gas making run, in which steam is first passed through the fuel bed in the generator, I introduce steam from a pipe 62 at the top of the superheater as into the pipe 31 which is at the gas off-take end of the usual water gas plant. This steam is passed in a reverse direction to that usually employed, passing first through the superheater 3, thence through the carburetor 2, and then finally through the incandescent fuel in the generator where it is broken up, the resultant gas being taken out at the point where air and steam would normally be introduced to the generator, in carrying out the usual water gas process, as by pipe 8. This steam absorbs heat from the superheater and the generator until it is highly superheated. When it reaches the generator it comes in contact with the coal or other fuel which is introduced thereto. This steam is sufficiently hot to volatilize some of the constituents of the coal and particularly so, if the coal be very finely reduced or powdered. If an up run is employed the gas off-take 8 is closed and steam admitted through the pipe 6, the steam passing upwardly through the fuel bed, thereby generating water gas, which is then passed through the carburetor and superheater to the gas off-take 31. Where a down run is employed steam is admitted through pipe 60 and passes in a downward direction through the fuel bed. The gas generated thereby is taken off through the valve 42 and the upright pipe 41, passing thence through the carburetor and superheater. The result is the formation of a considerable amount of coal gas which is passed through the incandescent fuel and discharged through the pipe 8.

Any suitable and well known means for reversing the flow of gas through the entire plant may be employed. Ordinarily this result will be accomplished by the use of valves which may be placed in the pipes 8 and 31 respectively, or, if desired, seal pots of any suitable construction may be used. Obviously by thus reversing the flow of gas through the plant as a whole the necessity for reversing the flow within the generator itself is avoided, and consequently the hot valve 40 of the usual gas set, is rendered functionless or may be dispensed with entirely. Similarly the valve 42 and pipe 41 of the old form of gas plant are rendered ineffective and may be eliminated in a new plant. It will be understood that where the improved process is applied to an old plant the valve 40 remains permanently open and the valve 42 permanently closed, there being no passage of gas through the pipe 41 and valve 42 during any phase of the operation of the plant. Likewise valve 60 in pipe 61 remains functionless during the operation of the improved process.

The steam in passing through the superheater and the carburetor comes in contact with any carbon which may have been deposited therein during the operation of the plant in the usual manner of a water gas plant. This carbon being highly heated and incandescent, combines with the steam to make water gas, thus securing two desirable results, one the utilization of this carbon for the making of gas and the other the prevention of clogging of the superheater and the carburetor with carbon and the resulting necessity of cleaning the same. The superheated steam is also further acted upon by the incandescent fuel bed of the generator to produce more water gas. The gas produced during this run of the apparatus is a combination of coal gas and water gas.

When the superheater and the carburetor have, by such a run as just described, been reduced in temperature to that which is most desirable for the operation of a water gas plant, this flow of steam is cut off and the usual flow of steam, either up or down as is customary in usual water gas operation through the fuel bed in the generator, is commenced, the gas thereby formed passing on through the carburetor and superheater. During this run the supply of coal to the generator is discontinued and the supply of oil to the carburetor is commenced.

When the fuel bed has been reduced in temperature to the minimum desirable temperature for gas making, this water gas making run is stopped and the blasting run is started, after the usual manner of handling a water gas plant.

The means for introducing coal or other fuel to the generator may be varied as desired and any apparatus used which is found suitable. The apparatus illustrated consists of a hopper 18 for containing powdered coal, a screw feed 80 by which this is delivered in regular amounts to the charging pipe 81 by which it is admitted to the generator. It also includes a revolving shaft 9 to which is secured a disk 90 upon which the coal falls and from which it is discharged so as to be distributed instead of being all deposited at one point.

With the above apparatus operating in the manner described, the excess heat which has been found to be generated when coal is used for charging the generator, is utilized in the superheating of the steam and this in turn for the volatilization of the raw coal which is being charged in the generator, thus forming a certain amount of coal gas which is added to the water gas. This heat is therefore usefully used instead of being wasted, as was the case in such apparatus when charged with coal and operated after the manner of the usual water gas operation.

The passage of steam through the carburetor and the superheater of the usual water gas apparatus without first passing it through the generator is an effective manner of preventing clogging of these parts with carbon, as deposited carbon would thus be converted into water gas. This is a desirable result and an improvement upon the former plan of operation which may be practiced whether or not the other steps of my process are employed.

What I claim as my invention is:

1. The improvement in the process of making carbureted water gas which consists in varying the gas making run by at intervals passing steam in a reverse direction through the entire apparatus and simultaneously adding fuel directly to the generator 2. The improvement in the process of making carbureted water gas which consists in varying the gas making run by at intervals passing steam in a reverse direction through the entire apparatus and adding directly to the generator finely divided fuel simultaneously with said reverse flow.

3. The improvement in the process of making carbureted water gas which consists in varying the gas making run by at intervals passing steam in a reverse direction through the entire apparatus and adding finely divided coal to the fuel bed of the generator simultaneously with said reverse flow of steam.

4. The process of manufacturing carbureted water gas which consists in blasting a fuel bed to heat the carburetor and superheater, then passing steam in succession through the superheater, the carburetor, and the generator and simultaneously with the flow of steam introducing raw fuel to the generator, then reversing the flow of steam and passing it through the incandescent fuel bed.

5. The process of manufacturing water gas which consists in blasting a fuel bed to heat the carburetor and superheater then passing steam in succession through the superheater, carburetor, and the generator and simultaneously introducing raw fuel to the generator, then reversing the flow of steam and passing it through the incandescent fuel bed, adding a hydrocarbon to the resulting gas and transferring heat stored from the blasting operation to the resulting product to fix it.

6. The improvements in the process of making carbureted water gas, which, when done in a plant comprising a generator, a single carburetor, and a single superheater, connected in series in constant and uniform relation with a permanently free passage between the generator and the carburetor, comprise a reversing of steam flow through the entire plant.

7. The improvement in the process of making carbureted water gas, which, when carried out in a plant comprising a generator, a single carburetor, and a single superheater, connected in series, in constant and uniform relation, comprises reversing the flow through such series as a whole.

8. The improvement in the process of making carbureted water gas, which, when carried out in a plant comprising a generator, a single carburetor, and a single superheater, connected in series in constant and uniform relation with a permanently free passage between the generator and carburetor, comprises both the supplying of steam and drawing off of gas from each end of the series.

Signed at Tacoma, Pierce County, Washington, this 8th day of June, 1921.

DANIEL J. YOUNG.